United States Patent
Hetherington et al.

(10) Patent No.: US 6,411,948 B1
(45) Date of Patent: Jun. 25, 2002

(54) METHOD, SYSTEM AND COMPUTER PROGRAM PRODUCT FOR AUTOMATICALLY CAPTURING LANGUAGE TRANSLATION AND SORTING INFORMATION IN A TEXT CLASS

(75) Inventors: David James Hetherington, Austin, TX (US); David Bruce Kumhyr, Fuquay-Varina, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/211,809

(22) Filed: Dec. 15, 1998

(51) Int. Cl.[7] .............................................. G06F 17/30
(52) U.S. Cl. .......................................... 707/2; 400/110
(58) Field of Search ............................... 707/2; 400/110

(56) References Cited

U.S. PATENT DOCUMENTS

| | | | | |
|---|---|---|---|---|
| 4,379,288 A | * | 4/1983 | Leung et al. ................. 341/28 |
| 4,544,276 A | * | 10/1985 | Horodeck ................... 400/110 |
| 4,737,040 A | | 4/1988 | Moon ......................... 400/110 |
| 4,951,202 A | | 8/1990 | Yan ............................. 364/419 |
| 5,040,218 A | | 8/1991 | Vitale et al. ................... 381/52 |
| 5,109,352 A | | 4/1992 | O'Dell ....................... 395/150 |
| 5,175,803 A | * | 12/1992 | Yeh ............................. 707/535 |
| 5,384,700 A | | 1/1995 | Lim et al. ................. 364/419.1 |
| 5,490,061 A | | 2/1996 | Tolin et al. ............. 364/419.02 |
| 5,649,223 A | * | 7/1997 | Freeman ..................... 707/534 |
| 5,787,452 A | * | 7/1998 | McKenna ................... 707/536 |
| 5,812,964 A | | 9/1998 | Finger ........................... 704/7 |
| 5,832,478 A | * | 11/1998 | George ......................... 707/3 |
| 5,870,084 A | * | 2/1999 | Kanungo et al. ........... 345/192 |
| 5,873,111 A | * | 2/1999 | Edberg ....................... 707/536 |
| 6,167,366 A | * | 12/2000 | Johnson ......................... 704/2 |

FOREIGN PATENT DOCUMENTS

| | | | |
|---|---|---|---|
| JP | 57-199070 | 12/1982 | ........... G06F/15/38 |
| JP | 5-224687 | 9/1993 | ............. G10L/3/00 |
| JP | 7-261652 | 10/1995 | ............ G09B/5/06 |

OTHER PUBLICATIONS

Intelligent Computer Keyboard for Entering Texts of Sinhalese and Other Similar Languages, Nov. 1992, IBM Technical Disclosure Bulletin, vol. 35, No. 6, pp. 24–27.
Enhanced Methods for Spelling Names in Speech Recognition Systems, Nov. 1995, IBM Technical Disclosure Bulletin, vol. 38, No. 11, pp. 45–46.

* cited by examiner

*Primary Examiner*—Wayne Amsbury
(74) *Attorney, Agent, or Firm*—Jeffrey S. LaBaw; Bracewell & Patterson, L.L.P.

(57) ABSTRACT

During composition of an ideograph which is entered into a text string in a data processing system by phonetic spelling on a typically data processing system keyboard, the keystrokes entered by the user are automatically captured and stored in a second field of a multi-field data packet into which the text string is being entered. The captured keystrokes thus provide a phonetic representation of the text string for users unfamiliar with the character set of the text string language. Intermediate representations, such as hiragana or katakana representations of a Japanese Kanji character, may also be automatically captured and stored in a third field within the multi-field data packet for other purposes. By switching the field displayed for the multi-field data packet containing the text string, a user may utilize the alternative representations to determine the correct meaning and pronunciation for the text string.

24 Claims, 5 Drawing Sheets

西 　　 林 　　 菅野

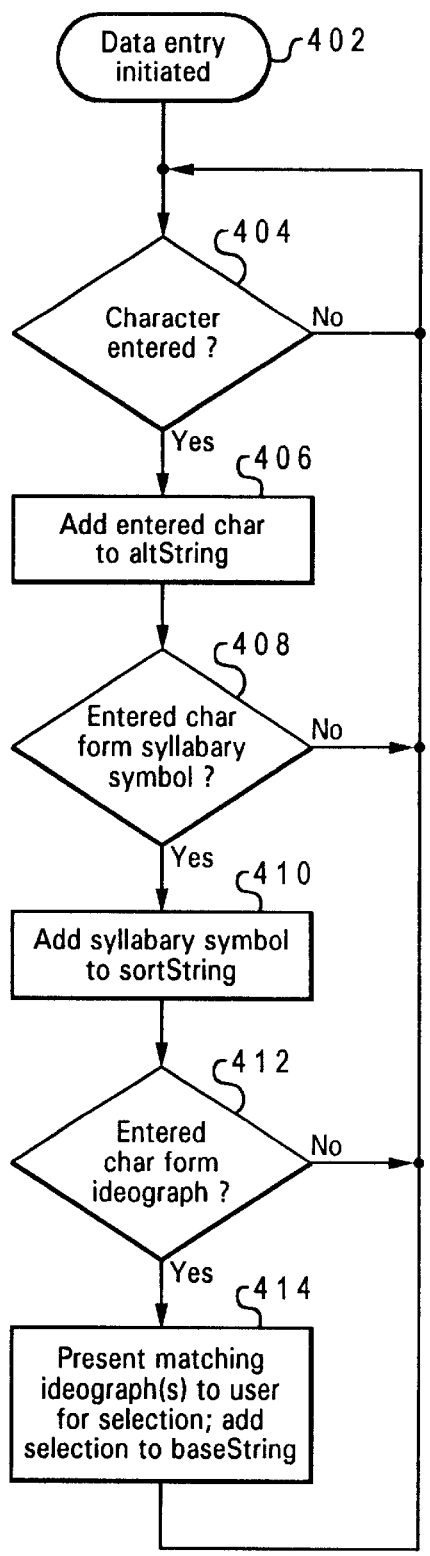
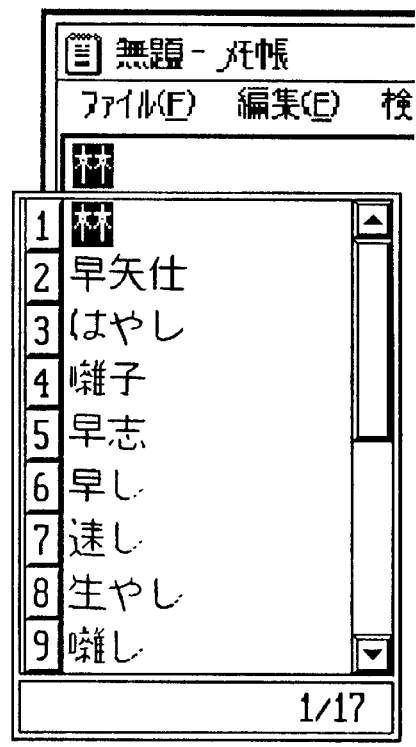
*Fig. 5G*
*Fig. 4*

METHOD, SYSTEM AND COMPUTER PROGRAM PRODUCT FOR AUTOMATICALLY CAPTURING LANGUAGE TRANSLATION AND SORTING INFORMATION IN A TEXT CLASS

RELATED APPLICATIONS

The present invention is related to the subject matter of the following commonly assigned, copending U.S. patent application Ser. No. 09/211,810 entitled "METHOD, SYSTEM, AND COMPUTER PROGRAM PRODUCT FOR PROVIDING A USER INTERFACE WITH ALTERNATIVE DISPLAY LANGUAGE CHOICES" and filed Dec. 15, 1998; Ser. No. 09/211,808 entitled "METHOD, SYSTEM AND COMPUTER PROGRAM PRODUCT FOR SORTING TEXT STRINGS" and filed Dec. 15, 1998; Ser. No. 09/211,803 entitled "METHOD, SYSTEM AND COMPUTER PROGRAM PRODUCT FOR STORING TRANSLITERATION AND/OR PHONETIC SPELLING INFORMATION IN A TEXT STRING CLASS" and filed Dec. 15, 1998; Ser. No. 09/211,799 entitled "METHOD, SYSTEM AND COMPUTER PROGRAM PRODUCT FOR ROTATING THROUGH A SEQUENCE OF DISPLAY STATES IN A MULTI-FIELD TEXT CLASS IN A GRAPHICAL USER INTERFACE" and filed Dec. 15, 1998; Ser. No. 09/211,802 entitled "METHOD, SYSTEM AND COMPUTER PROGRAM PRODUCT FOR CONTROLLING THE GRAPHICAL DISPLAY OF MULTI-FIELD TEXT STRING OBJECTS" and filed Dec. 15, 1998; Ser. No. 09/211,813 entitled "METHOD, SYSTEM AND COMPUTER PROGRAM PRODUCT FOR DISPLAYING THE CONTENTS OF ALL FIELDS IN A MULTI-FIELD TEXT STRING OBJECT" and filed Dec. 15, 1998; Ser. No. 09/211,801 entitled "METHOD, SYSTEM AND COMPUTER PROGRAM PRODUCT FOR DYNAMIC LANGUAGE SWITCHING IN A MULTI-FIELD TEXT STRING OBJECT VIA MESSAGING" and filed Dec. 15, 1998; and Ser. No. 09/211,812 entitled "METHOD, SYSTEM AND COMPUTER PROGRAM PRODUCT FOR AUTOMATIC CHARACTER TRANSLITERATION IN A TEXT STRING OBJECT" and filed Dec. 15, 1998. The content of the above-referenced applications is incorporated herein by reference.

BACKGROUND OF THE INVENTION

1. Technical Field

The present invention relates in general to text string representations in data processing systems and in particular to representing text strings in a manner permitting character recognition by a user not familiar with the character set of a default language for the text string. Still more particularly, the present invention relates to automatically capturing pronunciation information for a text string containing an ideograph composed by phonetic spelling.

2. Description of the Related Art

Multinational companies often run information system (IS) networks which span multiple countries spread around the globe. To maximize the usefulness of such networks, operations within each country tend to run in the local language of the country. Where possible, names of abstract objects in user applications are in the local language and match the local language organization, city, or human names which the abstract objects represent. In the case of system management software, often abstract objects would represent each of a global enterprise's local offices.

Central management of such a global network may be difficult or impossible when abstract object names utilize the local language and the local language's underlying character set. For offices located in Egypt, abstract objects would most naturally be named in Arabic; for those in Japan, objects would be named in Japanese. A problem arises, however, when a enterprise's headquarters IS staff attempts to examine these objects. The IS staff at the multinational headquarters located in the United States is unlikely to be able to read Arabic or Japanese.

Japanese, for example, is a logosyllabic or ideographic language which does not have an alphabet representing simple sounds, but instead has a very large character set with symbols ("ideographs") corresponding to concepts and objects rather than simple sounds. For instance, the Joyo Kanji List (Kanji for Daily Use) adopted for the Japanese language in 1981 includes 1945 symbols. User unfamiliar with the Kanji characters will have difficulty identifying a particular abstract object named in Japanese, as well as difficulty even discussing such abstract objects over the telephone with an English- and Japanese-speaking counterpart.

Additionally, merely seeing an ideograph may provide no clue as to the correct meaning or pronunciation since, in Japanese, the same character may have multiple meanings or pronunciations. For instance, the character depicted in FIG. 6A may mean either "West" or "Spain"; the symbol depicted in FIG. 6B may be pronounced either "hayashi" or "rin" (or "in"); and the characters depicted in FIG. 6C may be pronounced "suga no," "suga ya," "kan no," or "kan ya." This circumstance is based in part on the history of the Japanese language, in which the Kanji characters were adopted from the Chinese language. Thus, for example, the "rin" symbol depicted in FIG. 6B is On-Yomi, basically a simulation of the Chinese pronunciation when the character was imported to Japan, while "hayashi" is Kun-Yomi, a Japanese word assigned to the character which has the same meaning.

It would be desirable, therefore, to capture and retain contextual meaning and pronunciation information associated with a text string for users unfamiliar with the character set employed by the language in which the text string was entered. It would further be advantageous to automatically capture such meaning and pronunciation information during composition of the characters entered into the text string.

SUMMARY OF THE INVENTION

It is therefore one object of the present invention to provide an improved method and apparatus for text string representations in data processing systems.

It is another object of the present invention to provide a method and apparatus for representing text strings in a manner permitting character recognition by a user not familiar with the character set of a default language for the text string.

It is yet another object of the present invention to provide a method and apparatus for automatically capturing and retaining pronunciation information for a text string containing an ideograph composed by phonetic spelling.

The foregoing objects are achieved as is now described. During composition of an ideograph which is entered into a text string in a data processing system by phonetic spelling on a typical data processing system keyboard, the keystrokes entered by the user are automatically captured and stored in a second field of a multi-field data packet into which the text string is being entered. The captured keystrokes thus provide a phonetic representation of the text string for users unfamiliar with the character set of the text string language.

Intermediate representations, such as hiragana or katakana representations of a Japanese Kanji character, may also be automatically captured and stored in a third field within the multi-field data packet for other purposes. By switching the field displayed for the multi-field data packet containing the text string, a user may utilize the alternative representations to determine the correct meaning and pronunciation for the text string.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIG. 4 is a high level flowchart for a process of data entry in a logosyllabic language into a multi-field text string class in accordance with a preferred embodiment of the present invention;

FIGS. 5A–5G are illustrations of user interface displays for a process of data entry in a logosyllabic language into a multi-field text string class in accordance with a preferred embodiment of the present invention.

DETAILED DESCRIPTION OF THE PREFERRED EMBODIMENT

Figures 1, 6A, 6B, 6C:
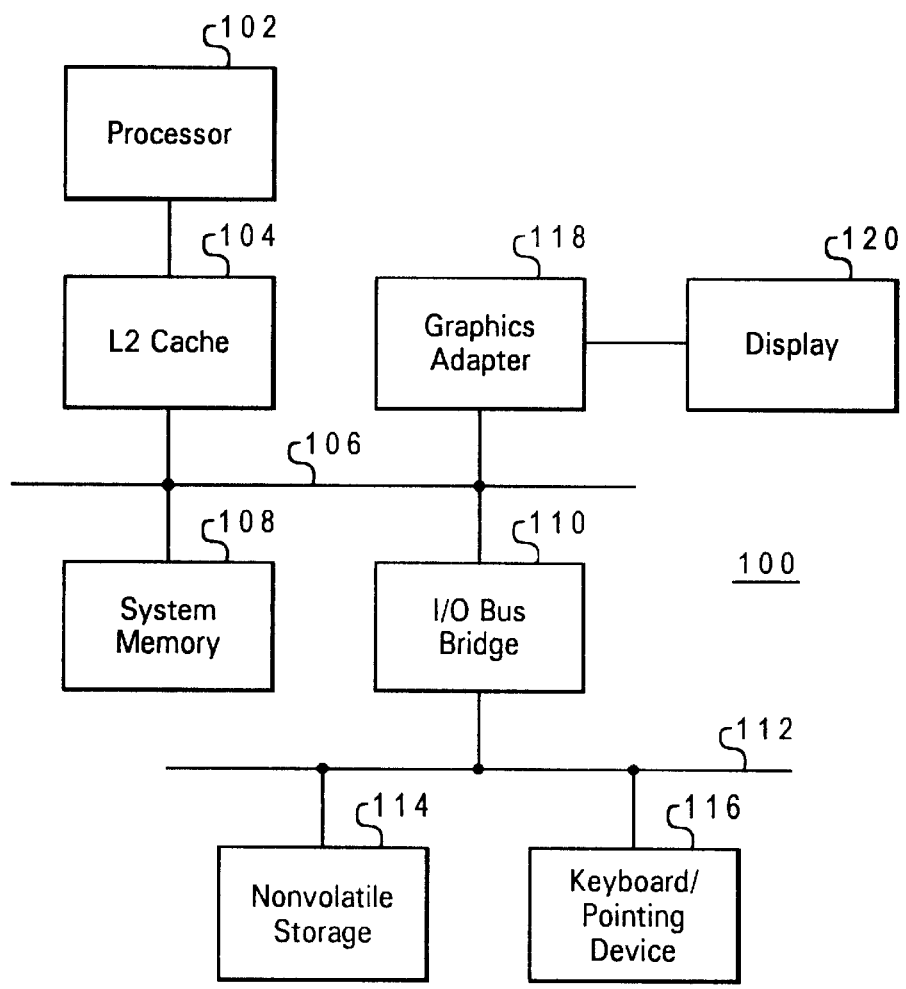
FIG. 1 depicts a diagram of a data processing system in which a preferred embodiment of the present invention may be implemented.
FIGS. 6A–6C are pictorial representations of known Japanese ideographs which may have multiple meanings or pronunciations.

With reference now to the figures, and in particular with reference to FIG. 1, a block diagram of a data processing system in which a preferred embodiment of the present invention may be implemented is depicted. Data processing system 100 may be, for example, one of the Aptiva® available from International Business Machines Corporation of Armonk, N.Y. Data processing system 100 includes a processor 102, which in the exemplary embodiment is connected to a level two (L2) cache 104, which is connected in turn to a system bus 106. In the exemplary embodiment, data processing system 100 includes graphics adapter 118 connected to system bus 106, receiving user interface information for display 120.

Also connected to system bus 106 is system memory 108 and input/output (I/O) bus bridge 110. I/O bus bridge 110 couples I/O bus 112 to system bus 106, relaying and/or transforming data transactions from one bus to the other. Peripheral devices such as nonvolatile storage 114, which may be a hard disk drive, and keyboard/pointing device 116, which may include a conventional mouse, a trackball, or the like, are connected to I/O bus 112.

The exemplary embodiment shown in FIG. 1 is provided solely for the purposes of explaining the invention and those skilled in the art will recognize that numerous variations are possible, both in form and function. For instance, data processing system 100 might also include a compact disk read-only memory (CD-ROM) or digital video disk (DVD) drive, a sound card and audio speakers, and numerous other optional components. All such variations are believed to be within the spirit and scope of the present invention. Data processing system 100 and the Java implementation examples below are provided solely as examples for the purposes of explanation and are not intended to imply architectural limitations. Those skilled in the art will recognize the numerous programming languages which may be utilized, all of which are believed to be embraced within the spirit and scope of the invention.

Figure 2:
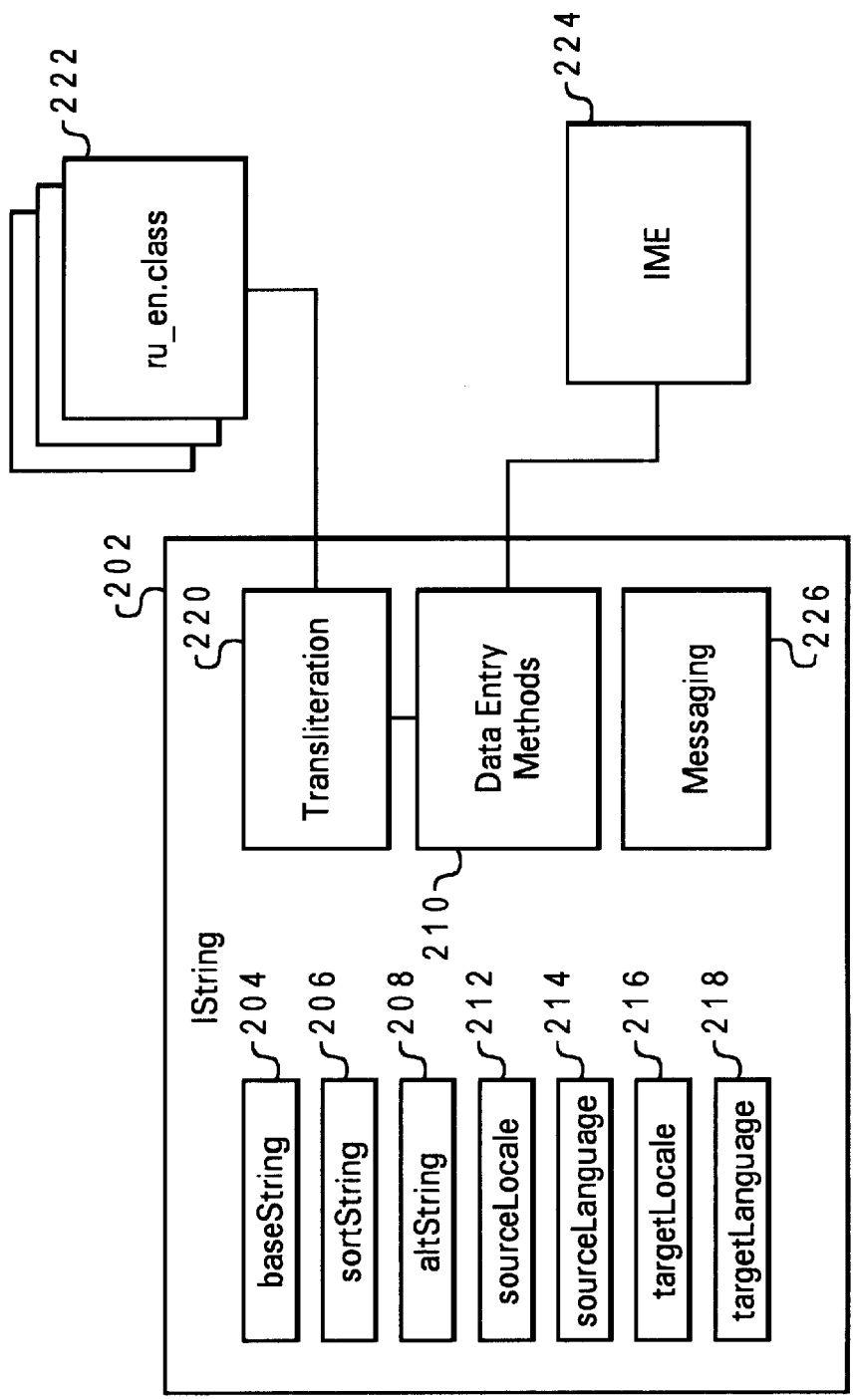
FIG. 2 is a diagram of a multi-field text string class employed in automatically capturing language translation and sorting information into a text class in accordance with a preferred embodiment of the present invention.

Referring to FIG. 2, a diagram of a multi-field text string class employed in automatically capturing language translation and sorting information into a text class in accordance with a preferred embodiment of the present invention is depicted. A fundamental problem in multi-national computing environments which need to display data in multiple human languages is that a spoken word generally encapsulates information in multiple aspects or attributes, such as through the word's meaning, from context, and/or from inflection. When reduced to a visual or electronic representation for manipulation or display in a data processing system, the word may lose some attributes and much of the associated meaning. Most importantly for data processing systems, a visual representation of a word may give no clues as to the correct translation or pronunciation of the word or the proper placement of a word within a specified sort order. International String ("IString") class 202 may be employed to address this problem.

IString class 202 is preferably a Java class similar to the Java String class, which behaves like the String class by including similar methods. Most of the original behavior of the String class should be preserved, with additional functionality added and utilized only as needed. IString class 202 is a datatype which captures some of the meaning of spoken words which is normally lost when the word is reduced to a visual representation. IString class 202 is preferably utilized for all object names and system messages within a system.

The IString class 202 structure includes three different strings for each name, message, data, or text object: a baseString 204, a sortString 206, and an altString 208. BaseString 204 is the string within IString class 202 employed by default in the user interface display and may contain any text, usually the original text entered by the user in the local language where the IString object is created. SortString 206 may also be any text and is employed to allow correct sorting of non-phonetic languages and languages which are difficult to sort based only on the binary value of baseString 204. AltString 208 may be any text but should conventionally be filled with a latin character set representation of the pronunciation of the data contained in baseString 204. Thus, IString class 202 includes the original text (baseString 204), a sort key (sortString 206), and a pronunciation key (altString 208) for object names, system messages, and other data.

When implemented in Java, a constructor for an IString class 202 object may be composed of the following fields:

/ * * The base text String * /
protected String baseString;
/ * * The related text String for proper collation * /
protected String sortString;

```
/ * * The related alternate text String (pronunciation key)
 * /
protected String altString;
/ * * The source locale, as an ISO-3166 code; used for
    collation * /
protected String sourceLocale;
/ * * The source language, as an ISO-639 code * /
protected String sourceLanguage;
/ * * The source variant defined for EBCIDIC and case
    mapping * /
protected String sourcevariant;
/ * * The target locale, as an ISO-3166 code * /
protected String targetLocale;
/ * * The target language, as an ISO-639 code * /
protected String targetLanguage;
/ * * The target variant defined for EBCIDIC and case
    mapping * /
protected String targetVariant;
```

Complete listings of the upper-case, two letter ISO Country Codes defined by ISO-3166 and the lower-case, two letter ISO Language Codes defined by ISO-639 are readily available from a variety of sources on the Internet.

Table I illustrates how data within the IString data type 202 looks when represented as a table:

TABLE I

| Field | Type | Data |
|---|---|---|
| baseString | Java String | The user's text |
| sortString | Java String | Language/locale dependent |
| altString | Java String | Language/locale dependent |
| sourceLocale | Java String | ISO-3166 code, example "US" |
| sourceLanguage | Java String | ISO-639 code, example "en" |
| sourceVariant | Java String | Variant code |
| targetLocale | Java String | ISO-3166 code, example "JP" |
| targetLanguage | Java String | ISO-639 code, example "ja" |
| targetVariant | Java String | Variant code |

A Java constructor for a new, empty IString class object 202 where the contents are independent of language or locale may be:

```
/ * * *
 *
 * <P></P>
 *
 * <dt><b>Description:</b><dd>
 * <p> Allocate a new IString containing no characters
     in the default
 * locale.</p>
 *
 * * *
    public IString( ) {
        this.baseString=new String( );
        this.sortString=new String( );
        this.altString=new String( );
        init( );
    }
```

To allow objects of the IString class 202 datatype to be stored in an Object Database (ODB), however, and to permit manipulation of IString data by Common Object Request Broker Architecture (CORBA) applications, an Interface Definition Language (IDL) class should be defined:

```
struct IString{
    string baseString;        //base test String
    string sortString;        //related text String for collation
    string altString;         //related alternate text String (pronunciation)
    string sourceLocale;      //source locale as an ISO-3166 code
    string sourceLanguage;    //source language as an ISO-639 code
    string sourceVariant;     //source variant code
    string targetLocale;      //target locale as an ISO-3166 code
    string targetLanguage;    //target language as an ISO-639 code
    string targetVariant;     //target variant code
}
```

The contents of baseString 204, sortString 206, and altString 208 are preferably but not necessarily Unicode text entered by data entry methods 210 within IString class 202. Data entry methods 210, and thus the contents of baseString 204, sortString 206, and altString 208, may depend at least in part on language and locale parameters defined by sourceLocale field 212, sourceLanguage field 214, targetLocale field 216, and targetLanguage 218.

Because data entry methods 210 are dependent on the locale and/or langauge employed by the underlying host system, creation of a new IString object 202 preferably results in the locale and language properties of the host system in which the IString object 202 is created being placed in sourceLocale field 212 and sourceLanguage field 214. A constructor for allocating a new, empty IString for a specified locale and language determined from the host system in which the IString class object 202 is being created may be:

```
/ * * *
 *
 * <P></P>
 *
 * <dt><b>Description:</b><dd>
 * <p> Allocate a new IString containing no characters
     in the
 * specified locale.</p>
 *
 * * *
    public IString(Locale loc) {
        this.baseString=new String( );
        this.sortString=new String( );
        this.altString=new String( );
        this.sourceLocale=loc.getLocale( );
        this.sourceLanguage=loc.getLanguage( );
        init( );
    }
```

Input of data into an IString class 202 object is preferably locale- or language-dependent. The sourceLanguage and targetLanguage properties 214 and 218 control how data is input into an IString class object 202 by data entry methods 210. The sourceLanguage property 214 may be set to the language property of the host system on which the IString class object is created. The targetLanguage property 218 may also be set to that language, or may alternatively be set to a common, "universal" language such as English. Data entry methods 210 compare sourceLanguage and targetLanguage properties 214 and 218 to determine what is entered into baseString 204, sortString 206, and altString 208 in an IString class object 202.

Character strings are entered into the baseString 204, sortString 206, and altString 208 fields by data entry methods 210 for IString class 202, which may selectively utilize data from either the user's direct entry or specification, from transliteration engine 220, or from the Input Method Editor (IME) 224. Where the targetLanguage property 218 is set to English as a default, data entry methods 210 determine the contents of baseString 204, sortString 206, and altString 208 fields based upon the character set employed by the language in which data is entered by the user (sourceLanguage property 214).

For languages which employ the latin character set, the user input is placed by data entry methods 210 into all three fields (baseString 204, sortString 206, and altString 208) of the IString class 202. A suitable constructor may be:

```
/ * * *
 *
 * <P></P>
 *
 * <dt><b>Description:</b><dd>
 * <p> Allocate a new IString which contains the same
     sequence of
 * characters as the string argument in the specified
     locale.</p>
 *
 * * *
     public IString(String str, Locale loc) {
         this.baseString=new String(str);
         this.sortString=new String(str);
         this.altString=new String(str);
         this.sourceLocale=loc.getLocale( );
         this.sourceLanguage=loc.getLanguage( );
         init( );
     }
```

For most locales and languages, the entered string will be input into all three fields of the IString object 202. If targetLanguage property 218 were not set to English, data entry methods 210 would input the user-entered text into all three fields whenever the languages identified in sourceLanguage and targetLanguage properties 214 and 218 employ a common character set (e.g., both employ latin characters, as in the case of Spanish and Afrikaans).

Table II illustrates how data is entered into IString class 202 fields where the host language and locale utilize the latin character set.

TABLE II

| Field | Type | Data |
|---|---|---|
| baseString | Java String | Hetherington |
| sortString | Java String | Hetherington |
| altString | Java String | Hetherington |
| sourceLocale | Java String | US |
| sourceLanguage | Java String | en |
| targetLocale | Java String | US |
| targetLanguage | Java String | en |

If desired, the fields may be individually edited and the object artificially promoted for sorting purposes by inserting a string having a lower sort value (e.g., "AAA_Hetherington") into sortString 206.

For languages which do not employ the latin character set, but which utilize a character set which may be sound mapped to the latin character set, the user input is entered by data entry methods 210 into baseString 204 and sortString 206, but a transliterated, phonetic representation of the input is placed in altString 208. An internal method within the transliteration engine 220 is employed to sound-map the passed string to a phonetic, latin character representation for altString 208 to transliterate entered characters into other characters understandable to people who are not familiar with the character set of the original language.

To generate the contents of altString 208, transliteration engine 220 selects an appropriate Java resource file 222 containing a mapping table to create the alternate text to be placed in altString 208. The selection of the particular resource file which is employed is based on the combination of source and target languages. Java resource files 222 are named for the combination of languages for which the mapping is being performed. In the example shown in FIG. 2, ru_en class is for mapping Russian (Cyrillic characters) to English (Latin characters). The structure of resource file 222 is a table with associated entries for foreign language characters and corresponding latin characters.

A suitable constructor for an IString object in which altString 208 is transliterated from the passed string may be:

```
/ * * *
 *
 * <P></P>
 *
 * <dt><b>Description:</b><dd>
 * <p> Allocate a new IString. The baseString and
     sortString are the
 * passed string, the altString is transliterated into the
     target
 * language.</p>
 *
 * * *
```

```
public (String(String str) {
    this.baseString = new String(str);
    this.sortString = new String(str);
    if(isSameLanguage(())
        this.altString = new String(str);
    else
        this.altString = transmogrify(str,
                                      this.sourceLanguage,
                                      this.targetLanguage);
}
```

The "transmogrify" method is the internal method within transliteration engine 220 which was described above. The character set into which the entered characters are transliterated is determined from the targetLanguage property 25 218, which in the exemplary embodiment is assumed to be set to English. Given an appropriate resource file 222, however, characters may be transliterated between any two languages for which characters in one language sound-map to one or more characters in the other.

Table III illustrates how data is entered into IString class 202 by data entry methods 210 where the language utilizes a non-latin character set which maps to the latin character set, such as Russian Cyrillic.

TABLE III

| Field | Type | Data |
|---|---|---|
| baseString | Java String | Давид Кумгир |
| sortString | Java String | Давид Кумгир |
| altString | Java String | David Kumhyr |
| sourceLocale | Java String | RU |
| sourceLanguage | Java String | ru |
| targetLocale | Java String | US |
| targetLanguage | Java String | en |

In the example shown, the text entered by the user is inserted into both baseString 204 and sortString 206, but the text entered into altString 208 is selected by transliteration engine 220 utilizing a resource table of Russian Cyrillic to English character sound mappings. The phonetic representation of the baseString 204 is thus entered into altString 208 as a pronunciation key for users unfamiliar with the Cyrillic character set.

For languages which do not employ the latin character set or a character set which may be sound-mapped to the latin character set, data entry methods 210 input data into the baseString 204, sortString 206, and altString 208 fields which is derived from the input method editor (IME) 224. IME 224 may be either a customized input method editor or the input method editor which is integrated into Asian versions of the Windows NT operating system available from Microsoft Corporation of Redmond Wash. If the Windows NT input method editor is employed, the appropriate data must be extracted from the Windows NT input method editor internal data storage.

Table IV illustrates how data is entered into IString class 202 by data entry methods 210 for logosyllabic languages, such as Japanese, which employ neither the latin character set nor a character set which may be sound-mapped to the latin character set.

TABLE IV

| Field | Type | Data |
|---|---|---|
| baseString | Java String | <Kanji> |
| sortString | Java String | はやし |
| altString | Java String | hayashi |
| sourceLocale | Java String | JP |
| sourceLanguage | Java String | ja |
| targetLocale | Java String | US |
| targetLanguage | Java String | en |

Logosyllabic languages do not have alphabets, but instead have very large character sets with symbols ("ideographs") corresponding to concepts and objects rather than simple sounds. For instance, the Joyo Kanji List (Kanji for Daily Use) adopted for the Japanese language in 1981 includes 1945 symbols. Normal computer keyboards cannot contain enough separate keys to have one for each symbol in the language, so input is accomplished phonetically utilizing keystroke combinations to select characters from one of two phonetic syllabaries, hiragana or katakana, and dictionary lookup for Kanji symbol creation. The process is implemented in the Windows NT input method editor identified above.

For logosyllabic or ideograhic languages, therefore, the data entered into altString 208 is the latin characters typed by the user to compose the desired ideograph. The data entered into sortString 206 are the syllabary characters phonetically spelling the desired ideograph, providing an intermediate representation of the ideograph. The data entered into baseString 204 is the final ideograph selected by the user. As with transliteration of non-latin characters as described above, non-latin characters may be entered into altString 208 if the targetLanguage property is set to a language other than English and IME 224 supports composition of the ideographs by phonetic spelling in a language other than English. For instance, an IString object 202 might contain Japanese Kanji in baseString 204, hiragana in sortString 206, and Cyrillic characters in altString 208 if IME 224 permits composition of Japanese Kanji characters by phonetic spelling in Russian.

A suitable constructor for receiving baseString 204, sortString 206 and altString 208 from IME 224 via data entry methods 210 for entry into an IString object 202 may be:

```
/ * * *
 *
 * <P></P>
 *
 * <dt><b>Description:</b><dd>
 * <p> Allocate a new IString. The baseString, sort-
     String and
 * altString are entered from the IME utilizing the
     default language and
 * locale.</p>
 *
 * * *
public IString(String base,
    String sort,
    String alt,
    Locale src,
    Locale tgt) {
    this.baseString=base;
    this.sortString=sort;
    this.altString=alt;
    this.sourceLocale=src.getLocale( );
    this.sourceLanguage=src.getLanguage( );
    this.targetLocale=tgt.getLocale( );
    this.targetLanguage=tgt.getLanguage( );
    init( );
}
```

The contents of baseString 204, sortString 206 and altString 208 are entered into the respective fields from data derived from IME 224, while the contents of sourceLocale 212 and sourceLanguage 214 are entered from the default locale and language properties specified by the host system in which data is being entered into IString object 202. The contents of targetLocale 216 and targetLanguage 218 will typically be a locale/language code for a language utilizing the latin character set such as "en_US" (English—United States).

Regardless of the language in which text is entered into an IString class object 202, the data automatically entered into each of the baseString 204, altString 206, and sortString 208 by data entry methods 210 may be overridden or altered using other methods. The fields of an IString object 202 may preferably be individually and independently edited, allowing artificial promotion within sortString field 206 as described above, replacement of an erroneously selected ideograph in baseString field 204, or correction of a phonetic spelling within altString field 208.

While the above-described methods assumed that the source and target languages were taken from host system defaults, data may alternatively be entered into baseString 204, sortString 206 and altString 208 for specified source and target languages utilizing the constructor:

```
/ * * *
 *
 * <P></P>
 *
 * <dt><b>Description:</b><dd>
 * <p> Allocate a new IString. The baseString, sort-
     String and
 * altString are entered from the IME for specified target
     and source
 * language and locale.</p>
 *
 * * *
public IString(String base,
    String sort,
    String alt,
    String srcLanguage,
    String srcLocale,
    String tgtLanguage,
    String tgtLocale) {
    this.baseString=base;
    this.sortString=sort;
    this.altString=alt;
    this.sourceLocale=srcLocale;
    this.sourceLanguage=srcLanguage;
```

```
        this.targetLocale=tgtLocale;
        this.targetLanguage=tgtLanguage;
        init( );
      }
```
In this constructor, the source and target language and locale which are employed to select the characters entered into baseString 204, sortString 206 and altString 208 may be specified. This latter constructor may be employed to create an IString object 202 in other than the host system default language, or in host systems where data for the IString object 202 is received from another system and a local instance is created.

It should be noted that transliteration engine 220 and messaging methods 226 need not necessarily be implemented within an IString class 202 as depicted in FIG. 2, and that IME method 224 need not be implemented separately. Transliteration engine 220 and messaging methods 226 may instead be implemented within separate subclasses which are appropriately constructed and/or invoked by IString class 202 as necessary, while IME 224 may be implemented as a method within IString class 202.

Transliteration engine 220 and IME 224 and are only required by data entry methods 210 to gather input data for IString class 202 objects under certain locale and language property settings. Otherwise, data may be programmatically input into baseString 204, sortString 206, and altString 208 by invoking the proper constructor. The methods which may be invoked by programs at runtime to programmatically get and set fields within IString 202 include:

```
    / * * *
     *
     * <P></P>
     *
     * <dt><b>Description:</b><dd>
     * <p> Get the IString baseString.</p>
     *
     * @returns Str String containing the base string
     *
     * * *
        public String getBaseString( ) {
            return this.baseString;
        }
```
This method returns the contents for baseString 204 for an IString object 202. Similar methods return the contents of sortString 206 and altString 208:
```
    / * * *
     *
     * <P></P>
     *
     * <dt><b>Description:</b><dd>
     * <p> Get the IString sortString.</p>
     *
     * @returns str String containing the sort string
     *
     * * *
        public String getSortString() {
            return this.sortString;
        }
    }
    / * * *
     *
     * <P></P>
     *
     * <dt><b>Description:</b><dd>
     * <p> Get the IString altString.</p>
     *
     * @returns str String containing the alt string
     *
```

```
        public String getAltString( ) {
            return this.altString;
        }
```
The methods also include setting baseString 204:
```
    / * * *
     *
     * <P></P>
     *
     * <dt><b>Description:</b><dd>
     * <p> Set the IString baseString.</p>
     *
     * @param str String containing the base string
     *
     * * *
        public void setBaseString(String sBase) {
            this.baseString=sBase;
        }
```
as well as sortString 206 and altString 208:
```
    / * * *
     *
     * <P></P>
     *
     * <dt><b>Description:</b><dd>
     *
     * @param str String containing the sort string
     *
     * * *
        public void setSortString(String sSrt) {
            this.sortString=sSrt;
        }
    / * * *
     *
     <P></P>
     *
     * <dt><b>Description:</b><dd>
     * <p> Set the IString altString.</p>
     *
        @param str String containing the alt string
     *
     * * *
        public void setAltString(String sAlt) {
            this.altString=sAlt;
        }
```
In addition to getting and setting baseString 204, sortString 206, and altString 208 for an IString object 202, programs may need to get or set the display locale or language of an IString object 202. Accordingly, other methods are provided to permit a program to get and/or set the locale or language properties of IString data:
```
    / * * *
     *
     * <P></P>
     *
     * <dt><b>Description:</b><dd>
     * <p> Get the locale of the IString data.</p>
     *
     * @returns loc Locale containing the locale of the data
     *
     * * *
        public Locale getLocale( ) {
            Locale loc=new Locale(this.sourceLanguage,
                this.sourceLocale);
            return loc;
        }
    / * * *
     *
```

```
    <P></P>
*
*   <dt><b>Description:</b><dd>
*   <p> Set the locale of the IString data.</p>
*
*   @param loc Locale of the data
*
* * *
    public void setLocale(Locale loc) {
        this.sourceLocale=loc.getLocale( );
        this.sourceLanguage=loc.getLanguage( );
    }
/ * * *
*
*   <P></P>
*
*   <dt><b>Description:</b><dd>
*   <p> Get the display language of the IString data.</p>
*
*   @returns Display language of the data
*
* * *
    public String getDisplayLanguage( ) {
        Locale loc=new Locale(this. sourceLanguage, this.
            sourceLocale);
        return loc.getDisplayLanguage( );
    }
/ * * *
*
*   <P></P>
*
*   <dt><b>Description:</b><dd>
*   <p> Get the display language of the IString data.</p>
*
*   @returns Display language of the data
*
* * *
    public String getDisplayLanguage( ) {
        if           (this.sourceLanguage==
            null&&this.sourceLocale==null)
            return null;
        else}
            Locale loc=new Locale(this.sourceLanguage,
                this.sourceLocale);
            return loc.getDisplayLocale( );
        }
    }
```

While these methods are available, IString class 202 preferably exhibits a "black box" behavior such that the programmer/user need not know anything about the methods implemented for IString class 202. IString class 202 simply appears as a data type which encapsulates extra information about baseString 204 and also includes some methods for transforming characters from one character set to another. For special cases where the sortString field 206 or altString field 208 are to be exposed to the user in addition to or in lieu of baseString 204, either for editing or for display only, a separate set of controls may be provided.

In the present invention, IString class 202 is employed to effectively transfer human language data across systems employing incongruous languages. The contents of baseString 204 provide a native representation of the text in the default language of the system originating the IString object 202. However, for each system participating in the exchange of data with other systems running in different human languages, the targetLocale property 216 and targetLanguage 218 property of an IString object 202 are preferably set to a common value (e.g., targetLocale="US", targetLanguage="en"). The contents of altString 208 will thus contain a common, cross-language representation of the text string. In systems where the default language of a system receiving an object differs from the language of the contents of baseString 204, IString class object 202 may automatically switch to presenting the contents of altString 208 as the text string to be displayed or processed.

Figure 3:
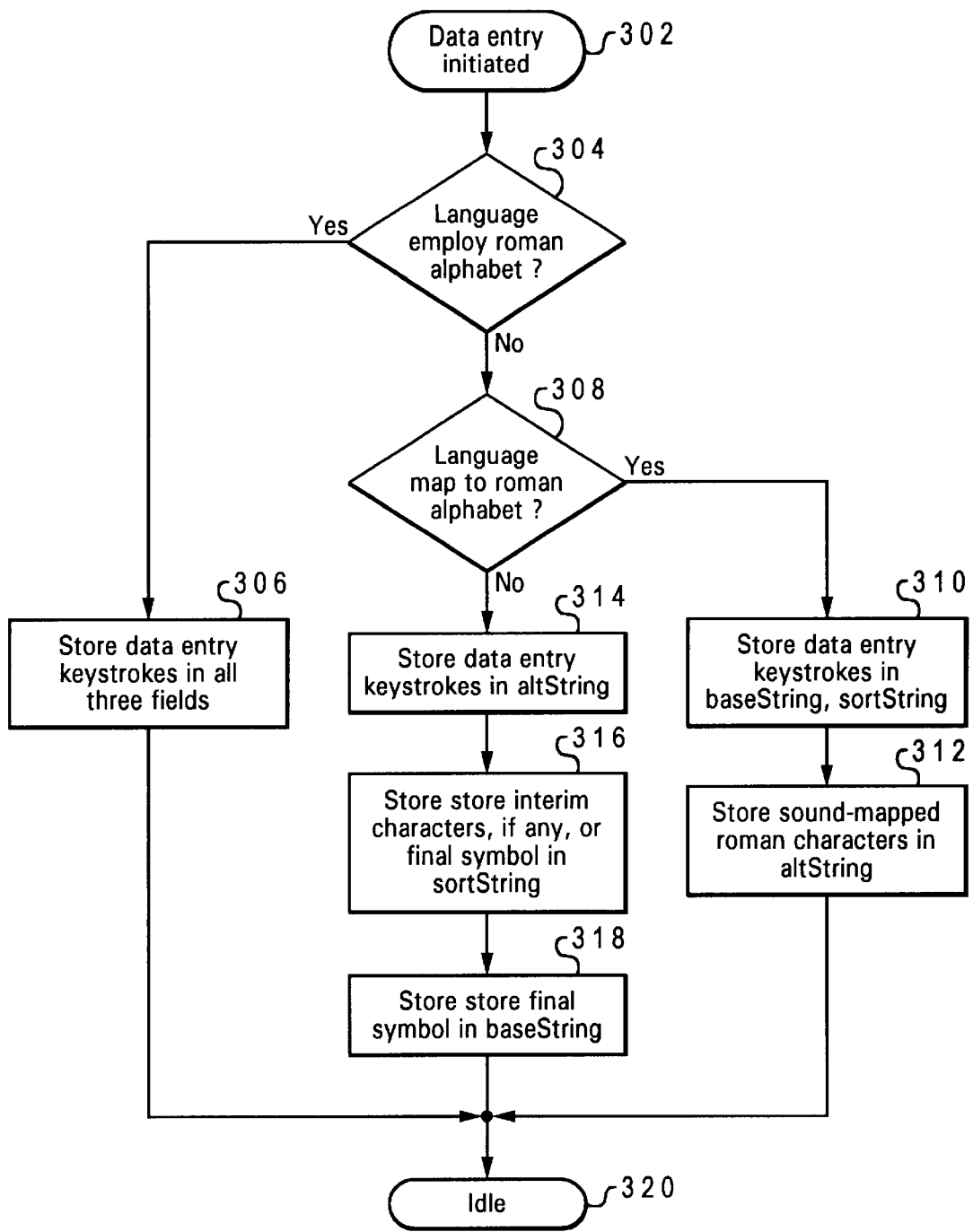
FIG. 3 depicts a high level flowchart for a process of entering data into a multi-field text string class in accordance with a preferred embodiment of the present invention.

Referring to FIG. 3, a high level flowchart for a process of entering data into a multi-field text string class in accordance with a preferred embodiment of the present invention is depicted. FIG. 3 is intended to be read in conjunction with FIG. 2. The process shown in FIG. 3 begins at step 302, which depicts initiation of data entry into a multi-field text string class (IString) object 302. The process then passes to step 304, which illustrates a determination of whether the currently selected language, specified by the operating system or application environment language and/or locale properties, employs the latin alphabet character set. Languages supported by a given system may be categorized to facilitate this determination, and the category employing the latin alphabet should include English and the romance languages (Spanish, French, Italian, etc.). If the current language employs the latin alphabet character set, the process proceeds to step 306, which depicts inserting the text entered by the data entry keystrokes into all three fields——baseString 204, sortString 206, and altString 208——of IString object 202. Thus, in most locales and/or languages for a locale, data is input programmatically by invoking the appropriate constructor and the baseString text is inserted into the other two fields by default.

Referring back to step 304, if the currently-selected language for data entry into the IString object does not utilize the latin alphabet character set, the process proceeds instead to step 308, which illustrates a determination of whether the currently selected language maps to the latin alphabet character set. This category of languages will most likely include, for example, Cyrillic, Greek, Hebrew, and many Germanic and Arabic languages. If so, the process proceeds to step 310, which depicts storing the text of the data entry keystrokes into the baseString and sortString fields 204 and 206, and then to step 212, which illustrates storing the entered text sound-mapped to latin alphabet characters in the altString field 208.

It should be noted that there may be some overlap between the first an second categories of languages, or——stated differently——some language-dependent variation in the manner in which language entry is handled. For example, for Spanish text, while most characters may be entered directly into all three fields of an IString class object, the "ñ" character may be sound mapped to "ny" in the altString field of an IString object to provide information regarding proper pronunciation. Alternatively, the altString field may be filled with a traditional phonetic pronunciation guide to the data entered into the IString object (e.g., "k üm-er" or "koo-mer") to provide pronunciation information for words in languages employing the latin alphabet character set as well as for ideographs.

Referring back to step 308, if the current language does not map readily to the latin alphabet character set (e.g., the language employs an ideographic character set), the process proceeds instead to step 314, which depicts storing the data entry keystrokes in the altString field 208 as a pronunciation guide, then to step 316, which illustrates storing intermediate characters (such as hiragana or katakana characters) in the sortString field 206, and finally to step 318, which depicts storing the ideograph in the baseString field 204.

Steps 314, 316 and 318 illustrates the operation of the IME in storing data in an IString object.

From any of steps 306, 312, or 318, the process proceeds to step 320, which illustrates the process becoming idle until data entry to an IString class object is again initiated. The distinct data entry behavior of the IString class based on the locale or language property allows raw keystrokes to be captured and saved as a pronunciation key in those regions or for those languages where phonetic spelling is employed to enter ideographic data. Interim representations of the word are also automatically captured and may serve as a sort key. This allows meaning associated with a word which otherwise might be lost to be retained by the system.

With reference now to FIG. 4 and FIGS. 5A through 5G, a high level flowchart and corresponding user interface displays for data entry in a logosyllabic language into a multi-field text string class in accordance with a preferred embodiment of the present invention are depicted. FIGS. 4 and 5A–5G are intended to be read in conjunction with each other and with FIG. 2, and depict the process of IME 224 in generating the contents of baseString 204, sortString 206, and altString 208 for an ideographic (or logosyllabic) language as described in connection with steps 314, 316, and 318 of FIG. 3.

For Japanese and similar logosyllabic languages, the IME 224 monitors the keystrokes entered, selecting appropriate hiragana (or katakana) characters, and finally presents a list of possible matching Kanji symbols. The process begins at step 402, which illustrates data entry being initiated with the language selected not mapping to the latin alphabet character set. The process may thus be performed between steps 308 and 314 depicted in FIG. 3. From step 402, the process first passes to step 404, which illustrates a determination of whether a character has been entered by the user. Any character entry should be in latin alphabet characters, even for logosyllabic languages. As noted earlier, data input for such languages is accomplished phonetically utilizing combinations of latin alphabet characters to select symbols from phonetic syllabaries, with a dictionary lookup for the final ideograph.

If no character was entered, the process proceeds from step 404 back to step 404, to continue polling for character entry. If a character is entered, however, the process proceeds instead to step 406, which depicts adding the entered character into altString 208. The process then passes to step 408, which illustrates a determination of whether the entered character, together with any previously entered characters which have not yet been mapped to a syllabary symbol, corresponds to a syllabary symbol. If not, the process returns to step 404 to await further character input. If so, however, the process proceeds instead to step 410, which depicts adding the syllabary symbol corresponding to the entered character(s) to sortString field 206.

From step 410, the process then passes to step 412, which illustrates a determination of whether the entered character, together with any previously entered characters which have not yet been mapped to an ideograph, corresponds to an ideograph. If not, the process returns to step 404 to await further character input. If so, however, the process proceeds instead to step 414, which depicts presenting the (potentially) matching ideograph or ideographs to the user for selection, then adding the selected ideograph to baseString 204. The process then returns to step 404 to await further input, and continues as described until interrupted by a control indicating the data entry is completed or terminated. Those skilled in the art will recognize that some mechanism should be provided for prevented termination of data entry when latin alphabet characters entered to phonetically compose an ideograph do not correspond to any available ideograph in the dictionary.

Figure 5A:
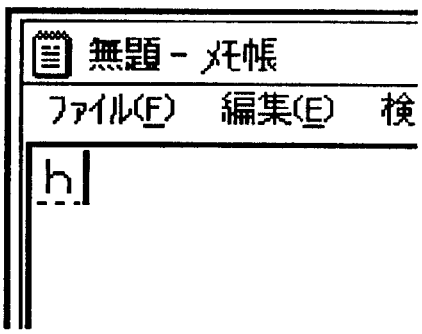
Figure 5B:
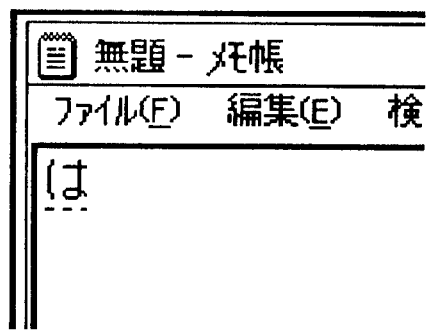

A specific example of data entry utilizing IME 224 is illustrated for the data in Table III by FIGS. 5A through 5G. In composing the word "hayashi," the user would first enter "h". This is not a valid hiragana character, so IME 224 will display the "h" as shown in FIG. 5A, add the "h" to the altString filed 208, and wait for the next character to be entered. The user next enters "a", forming the phoneme "ha", for which IME 224 may temporarily display "ha", then select and display "は" in lieu of "ha". Alternatively, IME 224 may simply select and display "は" in lieu of "h" as shown in FIG. 5B. IME 224 also adds the "a" to the altString field 208 and adds "は" to sortString field 206.

Figure 5C:
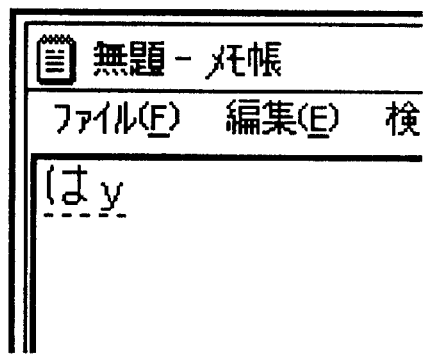
Figure 5D:
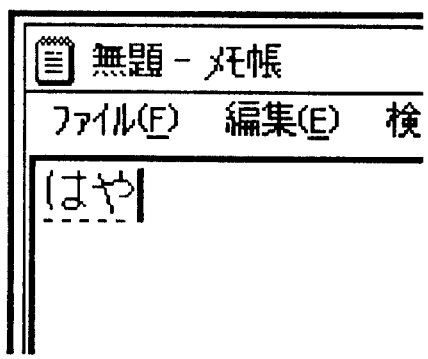
Figure 5E:
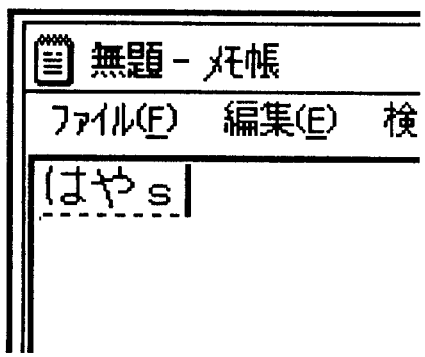
Figure 5F:
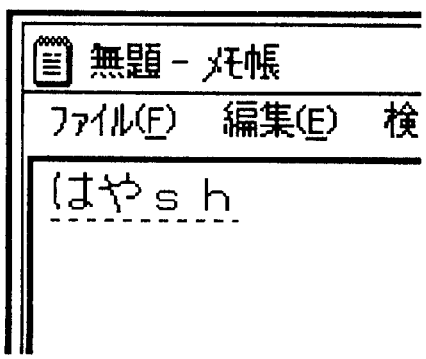

Similarly, upon entry of "y" by the user, IME 224 displays the "y" as shown in FIG. 5C and adds that character to altString 208; upon entry of "a", IME 224 selects and displays "や" in place of the "y" as shown in FIG. 5D, then adds "a" to altString 208 and "や" to sortString 206. Following user entry of "s", IME 224 adds the character to altString 208 and displays the character as shown in FIG. 5E; when the user subsequently enters "h", IME 224 adds the character to altString 208 and displays the character as shown in FIG. 5F.

Finally, upon user entry of "i", which causes the entered text to correspond to a phonetic spelling of a Kanji character, IME 224 adds "i" to altString 208 and selects and adds "し" to sortString 206. As each latin character is entered by the user and added to altString 208, or alternatively as each hiragana/katakana syllabary symbol is selected and added to sortString 206, IME 224 checks the lookup dictionary for possible Kanji symbols corresponding to the phonetic pronunciation entered. Upon determining a match, IME 224 presents a list to the user for selection as shown in FIG. 5G. The user selection is subsequently entered into baseString 204.

Filtering input to IString object 202 through IME 224, which may form a portion of the operating system, the application environment, or an editor, allows intermediate and alternative representations of a name or word to be captured along with the final form. This is particularly important for logosyllabic languages using ideographs, which are especially difficult to deal with for non-speakers of that language. Describing an ideograph over the telephone for assistance in determining meaning can be extremely challenging, a task further complicated where the same ideograph has multiple meanings or pronunciations. For instance, many Kanji symbols have multiple pronunciations and/or meanings. Therefore, merely seeing the characters does not provide enough information to know how to pronounce the name, which has resulted in the Japanese business card ritual of presented the card and pronouncing the name at the same time. Capturing intermediate representations within IString object 202 allows non-speakers to read and know how to pronounce or match ideographic characters.

It is important to note that while the present invention has been described in the context of a fully functional data processing system and/or network, those skilled in the art will appreciate that the mechanism of the present invention is capable of being distributed in the form of a computer usable medium of instructions in a variety of forms, and that the present invention applies equally regardless of the particular type of signal bearing media used to actually carry out the distribution. Examples of computer usable mediums include: nonvolatile, hard-coded type mediums such as read only memories (ROMs) or erasable, electrically programmable read only memories (EEPROMs), recordable type mediums such as floppy disks, hard disk drives and CD-ROMs, and transmission type mediums such as digital and analog communication links.

While the invention has been particularly shown and described with reference to a preferred embodiment, it will be understood by those skilled in the art that various changes in form and detail may be made therein without departing from the spirit and scope of the invention.

What is claimed is:

1. A method of capturing pronunciation information associated with a text string, comprising:

capturing characters corresponding to keystrokes entered by a user during composition of the text string;

storing the text string in a first field of a multi-field data packet;

receiving the captured characters in a second field of the multi-field data packet as a phonetic representation of the text string, wherein as each character is received, comparing the received character and any previously received characters to a phonetic spelling of each ideograph within a dictionary; and responsive to determining a match between received characters and a phonetic spelling of at least one ideograph within the dictionary, presenting the user with a choice of all ideographs having a phonetic spelling matching the received characters.

2. The method of claim 1, wherein the step of capturing characters corresponding to keystrokes entered by a user during composition of the text string further comprises:

capturing characters entered by a user to phonetically spell an ideograph.

3. The method of claim 1, wherein the step of storing the text string in a first field of a multi-field data packet further comprises:

storing the text string in a multi-field data packet including a plurality of fields each receiving a different representation of a single datum.

4. The method of claim 1, wherein the step of storing the captured characters in a second field of the multi-field data packet as a phonetic representation of the text string further comprises:

storing, in the second field, latin alphabet characters corresponding to a phonetic spelling of an ideograph stored in the first field.

5. The method of claim 1, further comprising:

storing an intermediate representation of the text string in a third field within the multi-field data packet, wherein the intermediate representation employs characters other than those captured from the keystrokes and those entered into the text string.

6. The method of claim 1, wherein the step of receiving a plurality of characters corresponding to keystrokes entered by a user to phonetically spell an ideograph entered into the text string further comprises:

receiving a plurality of latin alphabet characters phonetically spelling a Kanji symbol.

7. The method of claim 1, wherein the step of presenting the user with a choice of all ideographs having a phonetic spelling matching the received characters further comprises:

presenting the user with a choice of all Kanji symbols having a phonetic spelling matching a plurality of received latin alphabet characters.

8. The method of claim 1, further comprising:

as each character is received, comparing the received character or the received character and at least one previously received character to a phonetic spelling of a character within a syllabary; and responsive to determining a match between received characters and a phonetic spelling of a syllabary character within the syllabary, entering the syllabary character in a third field within the multi-field data packet.

9. A system for capturing pronunciation information associated with a text string, comprising:

means for capturing characters corresponding to keystrokes entered by a user during composition of the text string;

means for storing the text string in a first field of a multi-field data packet;

means for receiving the captured characters in a second field of the multi-field data packet as a phonetic representation of the text string, including means responsive to receiving each character, for comparing the received character and any previously received characters to a phonetic spelling of each ideograph within a dictionary; and means, responsive to determining a match between received characters and a phonetic spelling of at least one ideograph within the dictionary, for presenting the user with a choice of all ideographs having a phonetic spelling matching the received characters.

10. The system of claim 9, wherein the means for capturing characters corresponding to keystrokes entered by a user during composition of the text string further comprises:

means for capturing characters entered by a user to phonetically spell an ideograph.

11. The system of claim 9, wherein the means for storing the text string in a first field of a multi-field data packet further comprises:

means for storing the text string in a multi-field data packet including a plurality of fields each receiving a different representation of a single datum.

12. The system of claim 9, wherein the means for storing the captured characters in a second field of the multi-field data packet as a phonetic representation of the text string further comprises:

means for storing, in the second field, latin alphabet characters corresponding to a phonetic spelling of an ideograph stored in the first field.

13. The system of claim 9, further comprising:

means for storing an intermediate representation of the text string in a third field within the multi-field data packet, wherein the intermediate representation employs characters other than those captured from the keystrokes and those entered into the text string.

14. The system of claim 9, wherein the means for receiving a plurality of characters corresponding to keystrokes entered by a user to phonetically spell an ideograph entered into the text string further comprises:

means for receiving a plurality of latin alphabet characters phonetically spelling a Kanji symbol.

15. The system of claim 9, wherein the means for presenting the user with a choice of all ideographs having a phonetic spelling matching the received characters further comprises:

means for presenting the user with a choice of all Kanji symbols having a phonetic spelling matching a plurality of received latin alphabet characters.

16. The system of claim 9, further comprising:

means, responsive to receiving a character, for comparing the received character or the received character and at least one previously received character to a phonetic spelling of a character within a syllabary; and means, responsive to determining a match between received characters and a phonetic spelling of a syllabary character within the syllabary, for entering the syllabary character in a third field within the multi-field data packet.

17. A computer program product within a computer usable medium for capturing pronunciation information associated with a text string, comprising:

instructions for capturing characters corresponding to keystrokes entered by a user during composition of the text string;

instructions for storing the text string in a first field of a multi-field data packet;

instructions for receiving the captured characters in a second field of the multi-field data packet as a phonetic representation of the text string, including instructions responsive to receiving each character, for comparing the received character and any previously received characters to a phonetic spelling of each ideograph within a dictionary; and instructions, responsive to determining a match between received characters and a phonetic spelling of at least one ideograph within the dictionary, for presenting the user with a choice of all ideographs having a phonetic spelling matching the received characters.

18. The computer program product of claim 17, wherein the instructions for capturing characters corresponding to keystrokes entered by a user during composition of the text string further comprises:

instructions for capturing characters entered by a user to phonetically spell an ideograph.

19. The computer program product of claim 17, wherein the instructions for storing the text string in a first field of a multi-field data packet further comprises:

instructions for storing the text string in a multi-field data packet including a plurality of fields each receiving a different representation of a single datum.

20. The computer program product of claim 17, wherein the instructions for storing the captured characters in a second field of the multi-field data packet as a phonetic representation of the text string further comprises:

instructions for storing, in the second field, latin alphabet characters corresponding to a phonetic spelling of an ideograph stored in the first field.

21. The computer program product of claim 17, further comprising:

instructions for storing an intermediate representation of the text string in a third field within the multi-field data packet, wherein the intermediate representation employs characters other than those captured from the keystrokes and those entered into the text string.

22. The computer program product of claim 17, wherein the instructions for receiving a plurality of characters corresponding to keystrokes entered by a user to phonetically spell an ideograph entered into the text string further comprises:

instructions for receiving a plurality of latin alphabet characters phonetically spelling a Kanji symbol.

23. The computer program product of claim 17, wherein the instructions for presenting the user with a choice of all ideographs having a phonetic spelling matching the received characters further comprises:

instructions for presenting the user with a choice of all Kanji symbols having a phonetic spelling matching a plurality of received latin alphabet characters.

24. The computer program product of claim 17, further comprising:

instructions, responsive to receiving a character, for comparing the received character or the received character and at least one previously received character to a phonetic spelling of a character within a syllabary; and instructions, responsive to determining a match between received characters and a phonetic spelling of a syllabary character within the syllabary, for entering the syllabary character in a third field within the multi-field data packet.

* * * * *